United States Patent
Valls et al.

(10) Patent No.: US 6,939,935 B2
(45) Date of Patent: Sep. 6, 2005

(54) ANIONIC POLYMERS OF ACRYLIC AND/OR METHACRYLIC ACIDS AND MALEIC ESTERS, AND SALTS THEREOF, AND THEIR USE AS CEMENT/CONCRETE ADDITIVES

(75) Inventors: Ramon Valls, Barcelona (ES); Jaim Tuduri, Barcelona (ES); Rafael Pi Subirana, Granollers (ES)

(73) Assignee: Cognis Iberia S.L., Barcelona (ES)

( * ) Notice: Subject to any disclaimer, the term of this patent is extended or adjusted under 35 U.S.C. 154(b) by 0 days.

(21) Appl. No.: 10/309,968

(22) Filed: Dec. 4, 2002

(65) Prior Publication Data

US 2003/0120027 A1 Jun. 26, 2003

(30) Foreign Application Priority Data

Dec. 14, 2001 (EP) ............................................. 01129799

(51) Int. Cl.[7] ..................... C08F 218/16; C08F 222/02; C08F 222/16
(52) U.S. Cl. ................. 526/317.1; 526/318.3; 526/320; 524/558; 524/556; 524/560; 524/561; 524/5; 106/728; 106/823
(58) Field of Search ................................ 524/558, 556, 524/560, 561, 559, 5; 106/728, 823; 526/317.1, 318.3, 320

(56) References Cited

U.S. PATENT DOCUMENTS

| | | | |
|---|---|---|---|
| 5,614,017 | A | 3/1997 | Shawl |
| 5,665,158 | A | 9/1997 | Darwin et al. |
| 5,670,578 | A | 9/1997 | Shawl |
| 5,919,300 | A | 7/1999 | Bürge et al. |
| 6,034,208 | A | 3/2000 | McDaniel et al. |
| 6,139,623 | A | 10/2000 | Darwin et al. |
| 6,172,147 | B1 | 1/2001 | Abelleira et al. |
| 6,462,110 | B2 * | 10/2002 | Satoh et al. .................... 524/5 |
| 2002/0099115 | A1 * | 7/2002 | Shibai et al. ................... 524/2 |

FOREIGN PATENT DOCUMENTS

EP  1 090 901 A2  4/2001

* cited by examiner

Primary Examiner—Tatyana Zalukaeva
Assistant Examiner—Satya B. Sastri
(74) Attorney, Agent, or Firm—John F. Daniels

(57) ABSTRACT

Anionic polymers obtainable by: (a) esterifying maleic acid or its anhydride with alkyl polyalkylene glycols; (b) copolymerizing the esters obtained with (meth)acrylic acid; and (c) converting the polymers obtained into the salt form by addition of alkali metal bases; are disclosed.

18 Claims, No Drawings

ANIONIC POLYMERS OF ACRYLIC AND/OR METHACRYLIC ACIDS AND MALEIC ESTERS, AND SALTS THEREOF, AND THEIR USE AS CEMENT/CONCRETE ADDITIVES

BACKGROUND OF THE INVENTION

The production of water-containing cement preparations or concrete is attended by the problem of keeping the viscosity of the mix so low during production, transportation and use that problem-free processing is possible without the mixture becoming so thinly liquid that it runs from the mold. This equilibrium can be established through the water content, although such a quantity would generally be required that the cure time would be greatly increased. For this reason, viscosity adjusters are added to the preparations to keep the viscosity in the necessary range, even without the addition of relatively large quantities of water, and at the same time to delay the open time or setting time to such an extent that curing does not occur in transit.

Various polymers and their use as cement or concrete plasticizers are known from the prior art. EP 1090901 A1 (Takemoto) describes a process for the production of polyether esters with average molecular weights in the range from 5,000 to 40,000, in which methoxy polyalkylene glycol ethers are first reacted with methacrylic acid and the monomers obtained are polymerized in aqueous solution. U.S. Pat. No. 5,614,017 and U.S. Pat. No. 5,670,578 (Arco) both describe polymers obtained by esterification of polycarboxylic acids with polyethers. The reaction takes place in two steps, the mixture first being heated to 120° C. to remove water and then to 170° C. in order to carry out the actual esterification. According to U.S. Pat. No. 6,034,208 (Arco), hydroxy (meth)acrylates are reacted with alkylene oxides and the adducts obtained are polymerized with acrylic acid. U.S. Pat. No. 5,919,300 (Sika) discloses copolymers obtained by copolymerization of (a) N-vinyl amides or lactams, (b) esters of methacrylic acid with polyethylene glycols and (c) methacrylsulfonic acid. U.S. Pat. No. 5,665,158 (Grace) describes polymers obtained by reaction of poly(meth)acrylic acid with alkoxylated amines. The teachings of U.S. Pat. No. 6,139,623 and U.S. Pat. No. 6,172,147 (Grace) add to this process to the extent that defoamers (tributyl phosphate) or anionic surfactants (alkyl ether sulfate) are added in a final step.

Unfortunately, the known additives are far from satisfactory in regard to their performance properties. In many cases, viscosity is not sufficiently reduced so that the mixes solidify in transit from the manufacturer to the building site and can only be processed with considerable difficulty. Although, in other cases, viscosity is sufficiently reduced, the effect is time-dependent, i.e. either there is a complete collapse of viscosity or the mix suddenly solidifies—neither of which is, of course, desirable.

Accordingly, the problem addressed by the present invention was to provide new polymeric additives for the production of water-containing cement preparations or concrete, so-called "superplasticizers", which would be free from the disadvantages mentioned at the beginning and, in particular, would have better viscosity-adjusting properties.

SUMMARY OF THE INVENTION

This invention relates generally to polymers and, more particularly, to new anionic polymers based on maleic acid esters, to a process for their production and to their use as auxiliaries in the processing of cement and concrete.

The present invention relates to new anionic polymers obtainable by: (a) esterifying maleic acid or its anhydride with alkyl polyalkylene glycols; (b) copolymerizing the esters obtained with (meth)acrylic acid; and (c) converting the polymers obtained into the salt form by addition of alkali metal bases.

It has surprisingly been found that the new anionic polymers provide water-containing cement preparations or concrete with improved rheological behavior in relation to comparable known substances and, in addition, delay setting.

The present invention also relates to a process for the production of anionic polymers comprising the steps of: (a) esterifying maleic acid or its anhydride with alkyl polyalkylene glycols; (b) copolymerizing the esters obtained with (meth)acrylic acid; and (c) converting the polymers obtained into the salt form by addition of alkali metal bases.

DETAILED DESCRIPTION OF THE INVENTION

Esterification:

The formation of esters of maleic acid with alkyl polyalkylene glycols takes place in the first stage of the process. Although maleic acid can of course be directly introduced into the esterification reaction, it has proved to be of advantage to use maleic anhydride which is inexpensively available in large quantities. This has the further advantage that the production of the monoesters takes place quickly and quantitatively by virtue of the high ring tension of the maleic anhydride and no water of reaction is formed. Suitable alkyl polyalkylene glycols are substances corresponding to formula (I):

$$R^1(OCHCHR^2)_nOH \qquad (I)$$

in which $R^1$ represents alkyl groups containing 1 to 4 carbon atoms, $R^2$ is hydrogen or a methyl group and n is a number of 1 to 40. The compounds (I) are preferably methyl polyethylene glycols. Alkyl polyalkylene glycols and particularly alkyl polyethylene glycols corresponding to formula (I) with an average molecular weight of 200 to 2,000 dalton and more particularly 500 to 1,000 dalton are also preferably used. To produce the monoesters, it is advisable to use maleic anhydride and alkyl polyalkylene glycols in a molar ratio of 1:1 to 1:1.2. The reaction temperature may be in the range from 50 to 100° C. and is preferably about 80° C. To produce the diesters, molar ratios of 1:2 to 1:2.2 and more drastic conditions, i.e. temperatures of 120 to 150° C., have to be applied. In addition, it is advisable here to apply reduced pressure and to remove the water of condensation formed continuously from the equilibrium. Although, basically, it is desired to produce monoesters or mixtures with a high monoester content, the esterification products do of course always represent mixtures of which the mono-/diester distribution is largely controlled through the stoichiometry of the starting materials and the reaction conditions.

Polymerization and Neutralization:

Accordingly, in the second step, maleic acid mono- and/or diesters are copolymerized with (meth)acrylic acid. The polymerization can be carried out in known manner, i.e. in the presence of radical initiators, such as persulfates or bisulfites. Suitable comonomers are acrylic and methacrylic acid and mixtures thereof. After the start of the reaction, a marked increase in temperature is observed and suitable measures have to be taken to ensure that the temperature does not exceed 110° C., for example by cooling in an ice bath. The reaction can be carried out in organic solvents, for example glycol, although an aqueous medium is preferably used. Thereafter the polymers generally have an average molecular weight of 1,000 to 5,000 dalton. After the polymerization, the polymers are adjusted to a pH of 6 to 8 with aqueous alkali metal hydroxides such as, for example, sodium or potassium hydroxide. Clear solutions with a solids content of 40 to 50% by weight are obtained in this way.

Commercial Applications:

The present invention also relates to the use of the new anionic polymers as viscosity-adjusting or setting-retarding additives for water-containing cement preparations or concrete in which they may be present in quantities of 0.01 to 1% by weight and preferably in quantities of 0.1 to 0.5% by weight, based on the solids content of the preparations.

EXAMPLE 1

700 g (10 mol) maleic anhydride and 2240 g (10 mol) PEG200 methyl ester were introduced into a 5-liter three-necked flask and heated with stirring for 2 h to 80° C. The resulting maleic acid monoester was obtained in a substantially quantitative yield and was transferred to a second reactor in which it was mixed with acrylic acid in a molar ratio of 1:2. First 1,000 ml water and then—as initiator—0.1 mol ammonium persulfate and 0.5 mol sodium bisulfite were added to the reaction mixture at 20° C. A marked increase in temperature to 110° C. was soon observed. The polymerization was then terminated and the mixture was adjusted to pH 6.8 by addition of 50% by weight sodium hydroxide solution. The preparation represented a clear solution with a solids content of 42% by weight. The average molecular weight of the copolymer was 4,000 dalton.

EXAMPLE 2

Example 1 was repeated using 4,880 g PEG400 methyl ester. A clear solution with a solids content of 40% by weight was obtained. The average molecular weight of the copolymer was 5,000 dalton.

EXAMPLE 3

Example 1 was repeated using 4,480 g PEG200 methyl ester. The esterification took place at 150° C. and the water of condensation was continuously removed from the reaction equilibrium under reduced pressure. A mixture of mono- and diester was obtained and was polymerized with acrylic acid as described above. The final preparation was a clear solution with a solids content of 44% by weight. The average molecular weight of the copolymer was 4,200 dalton.

EXAMPLE 4

Example 1 was repeated using methacrylic acid instead of acrylic acid in the same molar quantity. The preparation represented a clear solution with a solids content of 42% by weight. The average molecular weight of the copolymer was 4,800 dalton.

EXAMPLE 5

Example 1 was repeated using 4 mol acrylic acid per mol ester. The preparation represented a clear solution with a solids content of 45% by weight. The average molecular weight of the copolymer was 5,000 dalton.

PERFORMANCE TEST EXAMPLES 100 g commercially available Portland cement were mixed with water in a ratio by weight of 4:1 and intensively stirred for 10 mins. until a viscous paste was obtained. The various viscosity adjusters were then added, followed by stirring for another 5 minutes. The viscosity of the resulting preparations was determined by the Brookfield method in an RVT viscosimeter (5 r.p.m., 20° C., spindle 1 with Helipath) and expressed in [cps]. The preparations were further characterized by the so-called cylinder test. To this end, an aluminium cylinder with a height of 65 mm and an external diameter of 90 mm was filled to the brim with the paste-like cement preparations. The cylinder was then removed so that the paste more or less quickly lost its shape under the effect of gravity and ran. The maximum diameter of the running paste within 10 seconds of the removal of the cylinder was determined. A diameter of 18 to 22 cm is regarded as optimal because this characterizes a preparation of which the viscosity is so low that it is easy to process, but high enough for the preparation not to run immediately from the mold. All the results are set out in Table 1. Examples 1 to 3 correspond to the invention, Examples C1 to C3 are intended for comparison.

TABLE 1

| Performance tests (concentration in % by weight, based on cement) | | | | |
|---|---|---|---|---|
| Example | Product | Concentration | Viscosity | Diameter |
| 1 | Product of | 0.1 | 40 | 19 |
| 2 | Example 1 | 0.3 | 10 | 25 |
| 3 | | 0.5 | 5 | 28 |
| C1 | Olinor SP 10[1)] | 0.1 | 55 | 7 |
| C2 | | 0.3 | 20 | 15 |
| C3 | | 0.5 | 5 | 25 |

[1)]Anionic polymer based on melamine (Cognis Iberia, S. L.)

It can be seen that the new anionic polymers according to the invention lead to lower viscosities of the preparations than a known commercial product in the same concentration. At the same time, however, the viscosity is high enough to provide the pastes with adequate stability It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An alkali metal salt of a copolymer of a maleic ester and a comonomer selected from the group consisting of acrylic acid, methacrylic acid and mixtures thereof, wherein the maleic ester comprises an esterification product of a component selected from the group consisting of maleic acid and maleic anhydride with an alkyl polyalkylene glycol, wherein the alkyl polyalkylene glycol corresponds to the general formula (I):

$$R^1(OCHCHR^2)_nOH \qquad (I)$$

wherein $R^1$ represents an alkyl group having from 1 to 4 carbon atoms, each $R^2$ represents a hydrogen or a methyl group and n represents a number of from 1 to 40; and wherein the salt of the copolymer has an average molecular weight of from 1,000 to 5,000 daltons.

2. The alkali metal salt of a copolymer according to claim 1, wherein the maleic ester comprises an esterification product of maleic anhydride and methyl polyethylene glycol.

3. A process for preparing an anionic polymer, said process comprising:

(a) esterifying a component selected from the group consisting of maleic acid and maleic anhydride with an alkyl polyalkylene glycol to form a maleic ester, wherein the alkyl polyalkylene glycol corresponds to the general formula (I):

$$R^1(OCHCHR^2)_nOH \qquad (I)$$

wherein $R^1$ represents an alkyl group having from 1 to 4 carbon atoms, each $R^2$ represents a hydrogen or a methyl group and n represents a number of from 1 to 40;

(b) copolymerizing the maleic ester with a comonomer selected from the group consisting of acrylic acid, methacrylic acid and mixtures thereof to form a polymer; and (c) neutralizing the polymer with an alkali metal base; wherein the polymer has an average molecular weight of from 1,000 to 5,000 daltons.

4. The process according to claim 3, wherein $R^1$ represents a methyl group and each $R^2$ represents a hydrogen.

5. The process according to claim 3, wherein the alkyl polyalkylene glycol has an average molecular weight of from 200 to 2,000 daltons.

6. The process according to claim 3, wherein the comonomer comprises methacrylic acid.

7. The process according to claim 3, wherein the polymer is neutralized to a pH of from 6 to 8.

8. The process according to claim 4, wherein the comonomer comprises methacrylic acid.

9. An anionic polymer prepared by the process according to claim 3.

10. An anionic polymer prepared by the process according to claim 4.

11. An anionic polymer prepared by the process according to claim 6.

12. An anionic polymer prepared by the process according to claim 8.

13. An aqueous solution of the anionic polymer according to claim 1, having a solids content of from 40 to 50% by weight.

14. An aqueous solution of the anionic polymer according to claim 9, having a solids content of from 40 to 50% by weight.

15. A uncured preparation comprising a component selected from the group consisting of cement and concrete, water, and the alkali metal salt of a copolymer according to claim 1.

16. A uncured preparation comprising a component selected from the group, consisting of cement and concrete, water, and an anionic polymer according to claim 9.

17. A method of retarding the set time of a cement or concrete preparation, said method comprising:

(a) providing a water-containing cement or concrete preparations; and (b) combining the preparation with the alkali metal salt of a copolymer according to claim 1.

18. A method of retarding the set time of a cement or concrete preparation, said method comprising:

(a) providing a water-containing cement or concrete preparations; and (b) combining the preparation with the anionic polymer according to claim 9.

* * * * *